(12) United States Patent
Delalandre et al.

(10) Patent No.: US 10,685,779 B2
(45) Date of Patent: Jun. 16, 2020

(54) COILED ELEMENTS COMPRISING A TEMPERATURE MEASURING DEVICE

(71) Applicant: SAFRAN ELECTRICAL & POWER, Blagnac (FR)

(72) Inventors: Nicolas Delalandre, Moissy-Cramayel (FR); Jacques Salat, Brie Comte Robert (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 15/524,333

(22) PCT Filed: Nov. 2, 2015

(86) PCT No.: PCT/FR2015/052945
§ 371 (c)(1),
(2) Date: May 4, 2017

(87) PCT Pub. No.: WO2016/071614
PCT Pub. Date: May 12, 2016

(65) Prior Publication Data
US 2017/0338035 A1    Nov. 23, 2017

(30) Foreign Application Priority Data
Nov. 5, 2014  (FR) ..................... 14 60673

(51) Int. Cl.
*H01F 27/40* (2006.01)
*H01F 5/02* (2006.01)
(Continued)

(52) U.S. Cl.
CPC ............ *H01F 27/402* (2013.01); *G01K 7/36* (2013.01); *H01F 5/02* (2013.01); *H01F 27/2847* (2013.01);
(Continued)

(58) Field of Classification Search
CPC .... H01F 27/402; H01F 27/2847; H01F 27/32; H01F 27/323; H01F 27/324; H01F 2027/406; H02K 3/04; H02K 7/36
(Continued)

(56) References Cited

U.S. PATENT DOCUMENTS 4,112,405 A * 9/1978 Joseph ................... H01F 27/402
                                                      310/68 C
4,454,554 A * 6/1984 Coleman ............... H01F 27/402
                                                      310/68 C
(Continued)

FOREIGN PATENT DOCUMENTS

CN        103162853 A    6/2013
DE    10 2012 010 848 A1   12/2013
(Continued)

OTHER PUBLICATIONS

U.S. Appl. No. 62/048,436, filed Sep. 2014, Annis; Jeffrey R.*
International Search Report dated Mar. 7, 2016 in PCT/FR2015/052945 filed Nov. 2, 2015.

*Primary Examiner* — Mang Tin Bik Lian
(74) *Attorney, Agent, or Firm* — Oblon, McClelland, Maier & Neustadt, L.L.P.

(57) ABSTRACT

A wound element made up of a plurality of superposed layers of turns wound on a core, including a sheet of a material that is thermally conductive at least in its plane, which sheet is interposed between two of the superposed layers of turns and has an end projecting from these layers and including at least one temperature probe for delivering temperature information about the wound element.

7 Claims, 1 Drawing Sheet

(51) Int. Cl.
*G01K 7/36* (2006.01)
*H01F 27/28* (2006.01)
*H02K 3/04* (2006.01)
*H01F 27/32* (2006.01)

(52) U.S. Cl.
CPC .............. *H02K 3/04* (2013.01); *H01F 27/323* (2013.01); *H01F 2027/406* (2013.01)

(58) Field of Classification Search
USPC ....... 336/221, 184, 105, 170, 179, 185, 199, 336/206, 207; 374/161, 152; 368/10; 361/38, 93.1; 315/383
See application file for complete search history.

(56) References Cited

U.S. PATENT DOCUMENTS

| | | | | |
|---|---|---|---|---|
| 5,917,397 | A * | 6/1999 | Sasahara | H01F 27/323 336/198 |
| 6,152,597 | A | 11/2000 | Potega | |
| 6,259,347 | B1 * | 7/2001 | Sines | H01F 27/22 336/205 |
| 6,842,100 | B1 * | 1/2005 | Kim | H01F 27/327 336/198 |
| 7,788,794 | B2 * | 9/2010 | Sarver | H01F 27/2871 29/602.1 |
| 9,336,942 | B2 * | 5/2016 | Yamada | H01F 37/00 |
| 2004/0145437 | A1 | 7/2004 | Lee | |
| 2007/0115088 | A1 * | 5/2007 | Sugioka | H01F 27/2823 336/232 |
| 2012/0242442 | A1 * | 9/2012 | Salomaki | H01F 27/2847 336/58 |
| 2016/0069750 | A1 * | 3/2016 | Annis | G01K 7/00 336/105 |

FOREIGN PATENT DOCUMENTS

| | | |
|---|---|---|
| EP | 0 342 468 A1 | 11/1989 |
| EP | 1 441 374 A1 | 7/2004 |
| JP | 6-290967 A | 10/1994 |
| JP | 8-78241 A | 3/1996 |
| WO | 99/00004 A2 | 1/1999 |

* cited by examiner

COILED ELEMENTS COMPRISING A TEMPERATURE MEASURING DEVICE

BACKGROUND OF THE INVENTION

The present invention relates in general manner to measuring temperature in turbomachines, and it relates more particularly to measuring temperature in wound elements such as transformers or inductors arranged in a housing in the environment of an engine (fan casing of an aeroengine) where the temperature of the housing must not exceed 204° C. in the event of a single failure (e.g. resulting from an electrical short circuit), which temperature is generally taken as being the self-ignition temperature of fuel vapors.

A winding of a wound element is an extremely heterogeneous combination made of copper, insulating films, resins, air, . . . . Furthermore, for reasons of electrical functionality, windings are made up of layers of turns that are extremely compact. Measuring temperature within such a wound element is thus found to be particularly difficult.

At present, two measurement methods can be distinguished. The first method, which is used mainly in the windings of rotary machines, consists in introducing temperature probes directly into the cores of wound elements. That requires having recourse to a winding method that is quite complicated in order to avoid damaging the probe without giving rise to unacceptable leakage inductance in order to achieve good electrical performance, and the level of losses nevertheless remains quite high.

The second method, which is used more particularly in the inductors and transformers of electricity networks, which components are particularly sensitive to leakage induction, consists either in bonding temperature probes onto the wound elements after they have been made, or else in encapsulating the probes in blocks of resin that are inserted between the wound elements. Nevertheless, bonding involves an additional industrial step that is particularly difficult, while encapsulation firstly involves putting the probe into position, which cannot be done accurately during encapsulation, and secondly can lead to failures not being detected because of the poor thermal conductivity of resins, which causes such temperature probes to have a response time that is very long.

There thus exists at present a need to find means that are simple from an industrial point of view for recovering temperature information rapidly from a winding without degrading its electrical performance.

OBJECT AND SUMMARY OF THE INVENTION

The present invention mitigates those drawbacks by proposing a temperature measurement device that forms an integral part of the wound element. An object of the invention is also to provide a device that is particularly suitable for detecting failures in such wound elements.

These objects are achieved by a wound element made up of a plurality of superposed layers of turns wound on a core, the element being characterized in that it includes a sheet of a material that is thermally conductive and paramagnetic in its plane, which sheet is interposed between two of said plurality of superposed layers of turns and has an end projecting from said plurality of layers and including at least one temperature probe for delivering temperature information about said wound element.

Having recourse to a sheet having high thermal conductivity in its plane enables temperature to be measured in a manner that is simple from an industrial point of view and that does not degrade the electrical performance of the winding. The reactivity and the robustness of the device also enables the fastest of failures to be detected.

Preferably, said sheet of material that is thermally conductive at least in its plane is constituted by a thermal diffuser having thermal conductivity in its plane lying in the range 350 watts per millikelvin (W/mK) to 10,000 W/mK, and is advantageously based on graphite or made of an orthotropic material.

Depending on the intended application, the wound element may form a winding of an electrical machine, of an inductor, or of a transformer, and if it forms part of a transformer, said sheet of material that is thermally conductive at least in its plane is also advantageously constituted by a material that is electrically insulating and it may take the place of at least one insulating film forming the interwinding capacitance of said transformer.

Advantageously, said projecting end has a plurality of temperature probes suitable for communicating temperature information to a common monitor unit to which they are connected by wire or wirelessly.

BRIEF DESCRIPTION OF THE DRAWING

The characteristics and advantages of the present invention appear better from the following description given by way of non-limiting indication and with reference to the accompanying drawings, in which.

DETAILED DESCRIPTION OF AN EMBODIMENT

Figure 1:
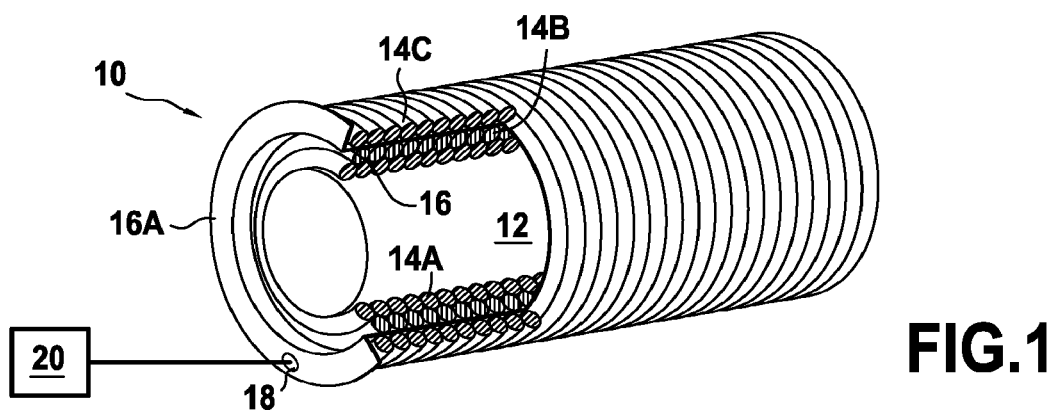
FIG. 1 is a diagrammatic cutaway view of an inductor including a temperature measurement device in accordance with the invention.

FIG. 1 is a diagrammatic cutaway view of an inductor 10 including, in conventional manner, a soft iron core 12 having, in the example shown, three layers 14A, 14B, and 14C of superposed copper turns wound thereon. In the invention, a sheet 16 of thickness that is small (but sufficient to ensure its mechanical strength) and that is thermally conductive at least in its plane (in order to ensure that temperatures are uniform) is interposed between two superposed layers and includes a projecting end portion 16A that goes beyond the layers of turns and that forms a collar. A temperature probe 18 is secured (by adhesive, by screw fastening, or by any other equivalent fastener means) to the collar and is suitable for communicating temperature information to a monitor unit 20 to which it is connected by wire or wirelessly.

Figure 2:
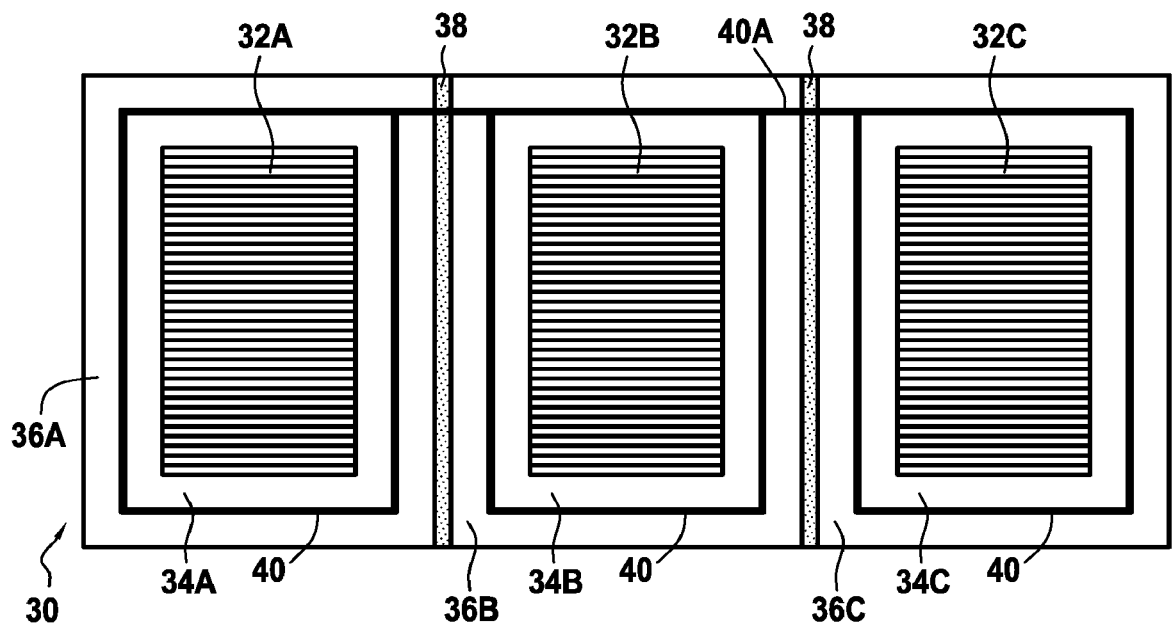
FIG. 2 is a section view of a transformer including a temperature measurement device in accordance with the invention.

FIG. 2 shows the invention implemented in a conventional three-phase transformer 30 with a winding having a laminated core made up of three legs 32A, 32B, and 32C having wound concentrically thereabout both respective low voltage windings 34A, 34B, and 34C, and respective high voltage windings 36A, 36B, and 36C. Resin 38 keeps the high voltage windings separate from one another, and the insulating film that conventionally separates each of the low voltage windings from the high voltage windings is replaced by a sheet 40 that is of small thickness and that is thermally conductive at least in its plane (it is also possible to envisage using isotropic thermal conductors) including a projecting end portion 40A projecting beyond the windings and forming a collar.

In the particular example of an autotransformer, the winding is constituted by a common secondary tertiary winding between two primary half-windings. Thus, the sheet is inserted between the secondary-tertiary and the half-primary windings.

As above, the collar 40A, which is outside the windings, is for receiving a temperature probe or preferably two temperature probes 42A and 42B (see FIG. 3A) that are connected to a common monitor unit (not shown) in order to detect a failure regardless of the branch in question of the autotransformer, while using a minimum number of probes.

For the purpose of detecting failures in wound elements for which levels of thermal dissipation are high, the temperature measurement device as provided in this way is particularly adapted to two known categories of failure, namely so-called "slow" failures for which detection time is longer than 4 seconds (s) to 5 s, and also, and above all, so-called "fast" failures for which the detection time must be less than 4 s to 5 s, and for which at present a temperature measurement (i.e. detection via an external thermal path using temperature probes bonded on the winding) is too slow to be effective, thus leading to non-detection of the failure.

Figures 3A, 3B:
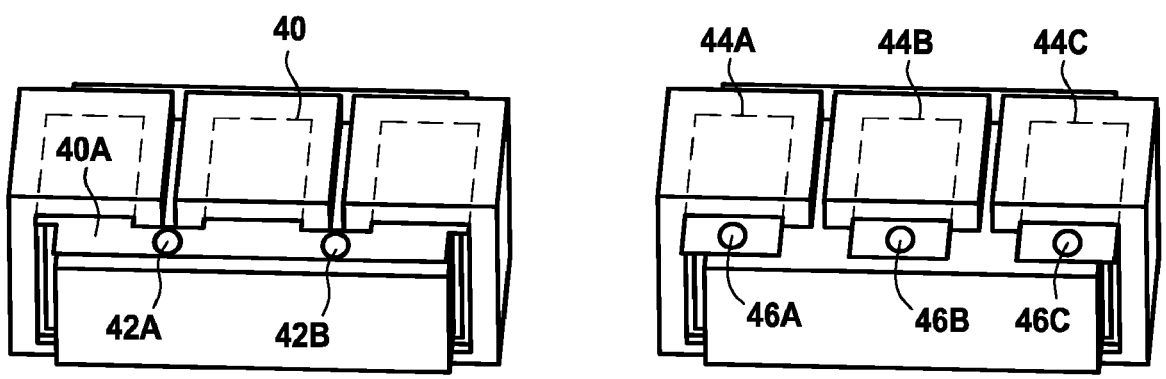
FIGS. 3A and 3B are perspective views of an example transformer respectively including two temperature probes and three temperature probes.

It should also be observed that it is possible to use one sheet 44A, 44B, 44C per branch of the transformer and thus three transformer probes 46A, 46B, 46C fastened on their respective collars in order to obtain a more accurate measurement, as shown in FIG. 3B. It should also be observed that, like an inductor, it is possible to use one sheet per low voltage winding and/or per high voltage winding in order to obtain a more accurate measurement of each winding (in which case six temperature probes are used), and in particular in the event of a transient (type of failure).

The shape (area) and the thickness of the sheet are essentially defined by the imposed thermal constraints (thermal conductivity at least in its plane), by the maximum allowable thickness (in particular given the expected mechanical strength), and by the number of probes to be installed, which itself is defined by the level of accuracy desired for the measurements, in particular in the event of transients (minimum response time). Thermal modeling has shown in particular that the three-probe solution has a reaction time that is twice as fast as the two-probe solution.

In addition, the need to have a material of small thickness and that is thermally conductive at least in its plane (although isotropic thermally conductive materials can also be envisaged) has led the inventors to opt for sheets of the thermal diffusion type made up of orthotropic materials having thermal conductivities in their plane that are at least as good as the thermal conductivity of copper (up to 1500 W/mK). Nevertheless, a thermal diffuser based on graphite, such as Spreadershield™ from the supplier GrafTech International, and initially designed for diffusing heat in electronic equipment (e.g. mobile telephones), with thermal conductivity of the order of 500 W/mK, has also been found to be particularly suitable (more generally, thermal conductivity in the range 350 W/mK to 10,000 W/mK is acceptable).

The technical solution proposed by the invention, consisting in inserting into the core of the winding (or indeed between two layers of the winding) a sheet of a material that is thermally conductive and preferably also electrically insulating, and that has an end projecting from the winding, makes it possible by installing a temperature probe on that external end of the sheet to obtain temperature information about the winding and to communicate it to a monitor unit for processing. In addition, the small thickness of the sheet makes it possible to avoid giving rise to leakage induction.

It should be observed that although the drawings show a three-phase transformer or autotransformer, it is clear that the invention is applicable to any wound element of an electrical machine.

The invention claimed is:

1. A wound element comprising:
a plurality of superposed layers of turns wound on a core; and
a planar sheet of a material that is thermally conductive,
wherein the planar sheet is interposed between two of said plurality of superposed layers of turns,
wherein the planar sheet has an end projecting from said plurality of superposed layers of turns, the end of the planar sheet projecting from said plurality of superposed layers of turns receiving at least one temperature probe for delivering temperature information about said wound element,
wherein the planar sheet has a thermal conductivity in a range of 350 W/mK to 10,000 W/mK,
wherein said planar sheet is constituted by a thermal diffuser,
wherein said thermal diffuser is an orthotropic material, and
wherein the end of the planar sheet projecting from the plurality of superposed layers of turns is perpendicular to an axis of the wound element.

2. The wound element according to claim 1, wherein the wound element forms a winding of an electrical machine.

3. The wound element according to claim 1, wherein the wound element forms a winding of an inductor.

4. The wound element according to claim 1, wherein the wound element forms a winding of a transformer.

5. The wound element according to claim 4, wherein said planar sheet is constituted by a material that is electrically insulating and that takes the place of at least one insulating film forming the inter-winding capacitance of said transformer.

6. The wound element according to claim 4, wherein said end of the planar sheet projecting from said plurality of superposed layers of turns receives a plurality of temperature probes suitable for communicating temperature information to a common monitor unit to which the plurality of temperature probes are connected by wire or wirelessly.

7. The wound element according to claim 1, wherein the end of the planar sheet projecting from the plurality of superposed layers extends beyond the plurality of superposed layers of turns.

* * * * *